United States Patent [19]
Hoff et al.

[11] Patent Number: 5,474,336
[45] Date of Patent: Dec. 12, 1995

[54] QUICK CONNECT TUBE COUPLINGS

[75] Inventors: Steven R. Hoff; Darwin C. Olson, both of Franklin, Tenn.

[73] Assignee: Dana Corporation, Toledo, Ohio

[21] Appl. No.: 308,895

[22] Filed: Sep. 20, 1994

[51] Int. Cl.[6] ........................................ F16L 21/06
[52] U.S. Cl. ..................... 285/322; 285/331; 285/243; 138/89
[58] Field of Search ..................... 285/322, 323, 285/347, 331, 234, 239, 240, 241, 242, 246, 243, 255, 101; 138/90, 89.3, 89.4, 96 R, 89

[56]     References Cited

U.S. PATENT DOCUMENTS

| | | | |
|---|---|---|---|
| 3,679,239 | 7/1972 | Schmitt | 285/331 |
| 4,407,526 | 10/1983 | Cicenas | 285/323 |
| 4,685,706 | 8/1987 | Kowal et al. | |
| 5,029,908 | 7/1991 | Belisaire | |
| 5,042,844 | 8/1991 | Iida et al. | 285/331 |
| 5,150,925 | 9/1992 | Yokomatsu et al. | 285/323 |
| 5,230,539 | 7/1993 | Olson | |
| 5,348,354 | 9/1994 | Badoureaux | 285/331 |

FOREIGN PATENT DOCUMENTS 4301168  7/1993  Germany ........................... 285/323

*Primary Examiner*—Dave W. Arola
*Assistant Examiner*—Heather Chun Shackelford
*Attorney, Agent, or Firm*—Millen, White, Zelano & Branigan

[57]     ABSTRACT

Quick connect tube couplings are configured for use with unstepped bores in conventional fittings, valves, manifolds and similar devices. The couplings each include a tube support which axially abuts a brass sleeve utilized to retain the coupling in the bore. The tube support further includes a stepped portion which locates a primary O-ring seal for sealing directly with a tube connected by the coupling and a secondary O-ring seal which seals with the wall of the bore. In accordance with one embodiment of the invention, the tube support is molded of plastic and, in accordance with another embodiment of the invention, the tube support is brass in order to accommodate tubes with thicker walls.

14 Claims, 3 Drawing Sheets

QUICK CONNECT TUBE COUPLINGS

1. FIELD OF THE INVENTION

This invention relates to quick connect tube couplings and more particularly to improvements in structures for such couplings.

2. BACKGROUND ART

The present invention is an improvement over couplings for flexible tubes used as fluid conduits in many different fluid power systems such as, for example, tubes for conveying pressurized air in vehicle air brake systems and air conditioning systems. The tubes require a coupling to connect the end of the tube to a body which may be a conventional fitting, valve, manifold, or similar device for transmitting and receiving pressurized air. Connecting a tube to a body, or removing the tube from a body, can be a time consuming and expensive task which is frequently performed in the field where specialized tools may not be readily available.

There are a wide variety of "push-to-connect" type couplings which permit a tube to be quickly and easily connected to a body without the use of tools. With these couplings, the tube is connected by simply press fitting the coupling in a bore within the body and then inserting the leading end of the tube into the coupling. Typically, the coupling contains a plurality of components which releasably retain the tube therein.

In order for presently used couplings to perform effectively, the bores in the bodies to which the tubes are connected are stepped and formed with relatively tight tolerances. In order to reduce manufacturing expenses and lessen the occurrences of coupling malfunctions, it is preferable to have unstepped bores which can be made with higher tolerances. Since currently available couplings require stepped bores, there is a need for new quick connect tube couplings which function effectively with an unstepped bore configuration.

SUMMARY OF THE INVENTION

In view of the aforementioned considerations, it is a feature of the present invention to provide new and improved quick connect couplings which are readily usable to connect tubes and plugs in unstepped bores.

In view of this feature and other features, the present invention is directed to couplings for connecting tubes or plugs to circular unstepped bores within a body wherein the tubes or plugs each have selected inner and outer diameters. The couplings comprise a tubular tube support having an inner, axially extending tube insertion portion with an outer diameter substantially equal to the inner diameter of the tube and plug. The tube support also has a radially extending portion with an axially facing surface. An annular sleeve abuts the axially facing surface of the tubular tube support and a collet having a radial flange portion and a tube gripping portion with an inner diameter greater than the outer diameter of the insertion portion of the tube fits within the sleeve. The collet has a frictional surface therein for engaging the tube or plug. A primary O-ring seal is disposed inboard of the collet and around the insertion portion of the tubular tube support. The primary O-ring seal has an inner diameter larger than the outer diameter of the tube insertion portion of the tube support for sealing against the outside surface of the tube. A secondary O-ring seal is disposed between the coupling and the circular bore within the body for sealing therewith.

In accordance with one embodiment of the invention, the tubular tube support is plastic and, in accordance with another embodiment of the invention, the tube support is metal.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

FIGS. 1–5—First Embodiment

Figure 1:
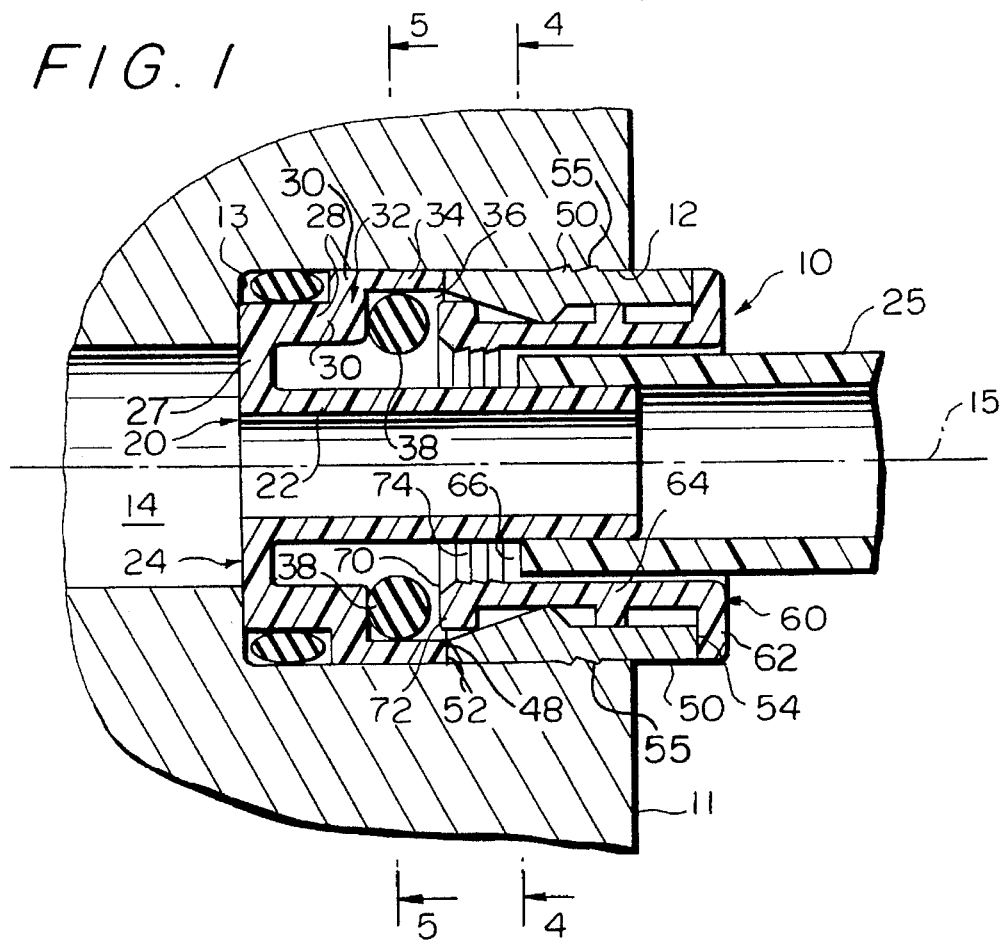
FIG. 1 is a side elevation view illustrating a first embodiment of a push-to-connect coupling configured in accordance with the present invention with a leading end of the tube partially inserted therein.

FIG. 1 is a cross-section of a first embodiment of a quick connect coupling 10 configured in accordance with the present invention. The quick connect coupling 10 is mounted in a body 11 which may be a conventional fitting, a valve, a manifold or a similar device. The body 11 has an unstepped bore 12 formed therethrough which has an annular bottom 13 which is coaxial with a circular passage 14 about an axis 15. As illustrated, the body 11 may be formed of a metallic material, such as brass or aluminum or alternatively may be formed of a plastic material such as reinforced nylon.

The coupling 10 includes a relatively rigid tubular support and O-ring gland 20 which has an inner axially extending tubular tube support portion 22 and a radially extending base portion 24. The tube support 22 has an outer diameter substantially equal to or complementary to the inner diameter of the tube 25 (FIGS. 1 and 2) or plug 26 (FIG. 3) inserted thereover so as to provide a friction fit therewith.

The radially extending base portion 24 of the tube support and O-ring gland 20 forms a base for supporting other elements of the assembly which comprises the coupling 10. The radially extending portion 24 is unitary with the tubular tube insertion portion 22 and includes a first radial flange 27 extending directly from the insertion portion 22, a first axial portion 28, and a second radial portion 30. The axial and second radial portions 28 and 30, respectively provide a step 32 from which extends a second axial portion 34. The step 32 defines an interior space 36 in which is disposed a primary O-ring seal 38 and an exterior space 40 in which is disposed a secondary O-ring seal 42. The primary O-ring seal 38 has an inner diameter larger than the outer diameter of the tubular tube insertion portion 22 of the tube support 20 and is deformed upon insertion of the tube 25 (FIGS. 1 and 2) or plug 26 (FIG. 3) to seal against the outside surface of the tube or plug. The secondary O-ring seal 42 has an inner diameter larger than the inner diameter of the primary O-ring seal 38 and an outer diameter larger than the unstepped bore 12 when the secondary O-ring seal is undeformed so as to seal between the coupling 10 and the axially extending wall of the unstepped bore 12.

Disposed in abutment with the end 48 of the second axial portion 34 is a brass sleeve 50 having an inner end 52 and an outer end 54. The brass sleeve 50 has annular barbs or teeth 55 which engage the cylindrical wall of the unstepped bore 12 to retain the coupling 10 in the body 11. In the embodiment of FIGS. 1–5, the tube support and O-ring gland 20 is plastic (see FIG. 5) while the sleeve 50 is metal, preferably brass.

Disposed within the brass sleeve 50 is a collet 60 which has a radial rim portion 62, which axially abuts the outer end 54 of the sleeve 50, and a collet insertion portion 64 which is received within the sleeve 50. The insertion portion 64 has an outer diameter less than the inner diameter of the sleeve 50 and an inner diameter greater than the outer diameter of the insertion portion 22 of the tube support and O-ring gland 20 to define a space 66 therebetween for receiving the tube 25 or plug 26. The collet 60 has an inner end 70 with an inner rim 72 that faces the primary O-ring seal 38. Adjacent the inner end 72 are a series of annular teeth 74 which provide a tube gripping portion.

Figure 2:
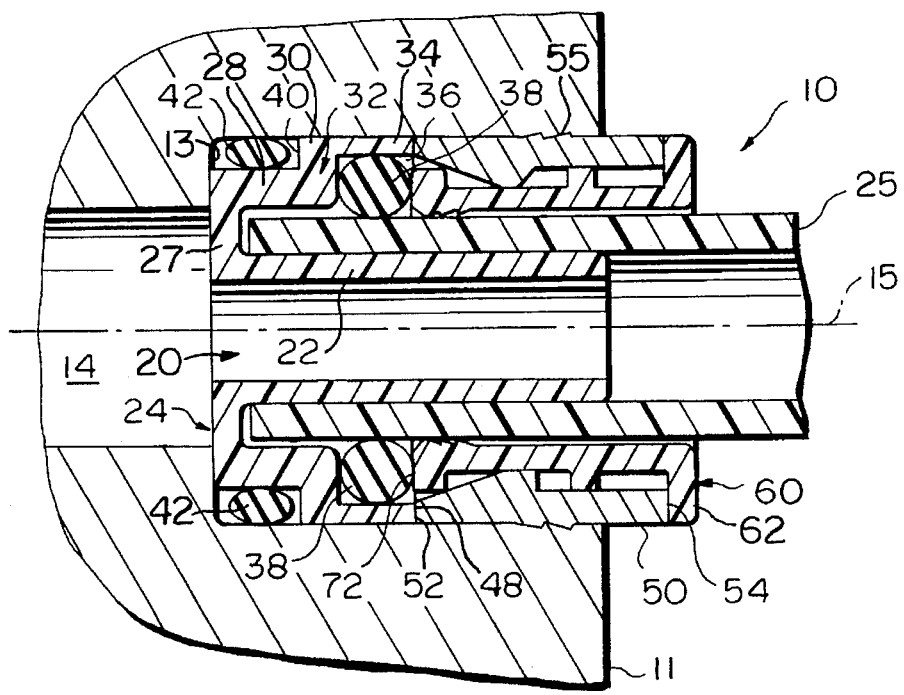
FIG. 2 is a view similar to FIG. 1 but showing the tube completely inserted within the coupling.

In operation, the tube 25 is pushed over the tube insertion portion 22 of the tube support and O-ring gland 20 and into the collet 60. As is seen in FIG. 2, the tube 25 is pushed all the way home to engage the radial flange 27 on the radial base portion 24 which provides the base of the tube support. When the tube 25 is seated in the tube support, the teeth 74 of the collet 60 engage the outer surface of the tube 25 so that the tube cannot be extracted from the coupling 10 without first axially displacing the collet 60. The primary O-ring seal 38 engages the exterior surface of the tube 25 to ensure a sealing arrangement with the tube support 20 while the secondary seal 42 is deformed slightly and seals with the wall of the unstepped circular bore 12 in the body 11.

Figure 3:
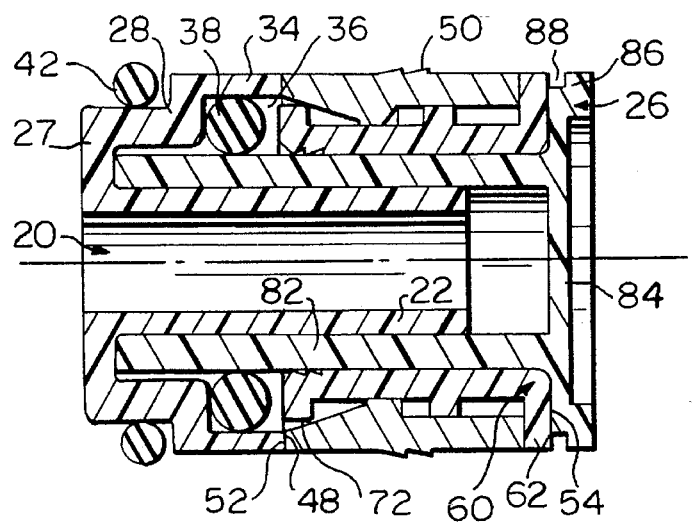
FIG. 3 is a view similar to FIG. 2 but showing a plug inserted into the coupling.
Figure 4:
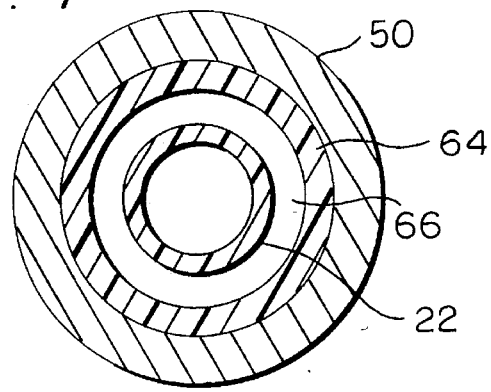
FIG. 4 is an elevational view taken along lines 4—4 of FIG. 1.

In FIG. 3, the plastic plug 26 is shown inserted into the quick connect coupling 10. The plug 26 holds the tube support and O-ring gland 20 assembled with the brass sleeve 50 and collet 60 during shipping and storage as well as optionally providing either a test or permanent closure of the passage 14 (see FIGS. 1 and 2). The plug 26 has a tubular shank portion 82 dimensioned with an inner and outer diameter similar to the tube 25 and is connected and disconnected from the coupling 10 in the same way as the tube. The plug includes a circular closure plate 84 which has a rim 86 that is offset slightly from the end of the collet 60 to provide a space 88 in which a tool can be inserted to lift the plug 26 out of the coupling 10.

Figure 6:
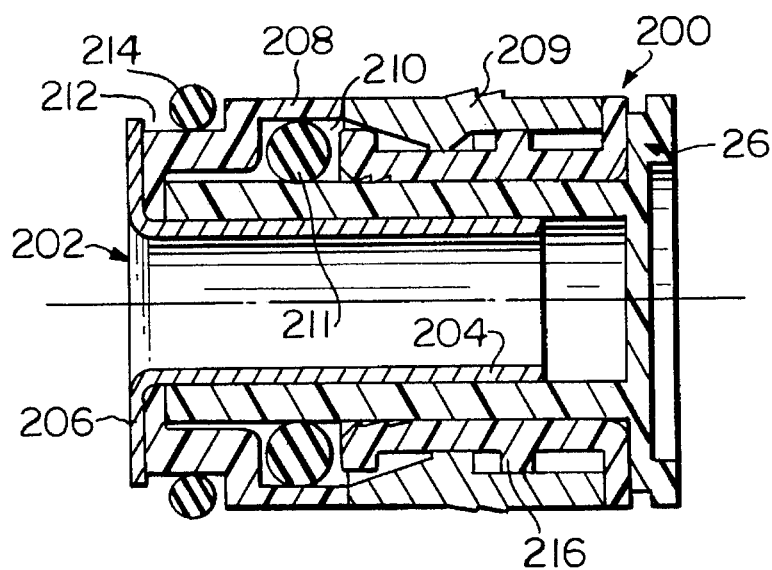
FIG. 6 is a side elevational view of a second embodiment of the present invention.

FIG. 6—The Second Embodiment

Referring now to FIG. 6, there is shown a second embodiment 200 of the coupling assembly. The second embodiment utilizes a tube support 202 which is made of a metal such as brass rather than plastic as is the case in the embodiments of FIGS. 1–5. The tube support 202 has a cylindrical insertion portion 204 and a radial flange portion 206 which is in the form of a planar radial plate and which comprises a base for the tube support. A molded plastic base member and O-ring gland 208 is provided as a spacer between a brass sleeve 209 and the radial flange 206. The base member and O-ring gland 208 is stepped at step 209 to provide an interior space 210 for a primary O-ring seal 211 and an exterior space 212 for the secondary O-ring seal 214. The collet 216 is substantially similar to the collet 60 of FIGS. 1–5 as is the plug 26.

By having a metal tube support such as the tube support 202, the walls of the tube support may be made thinner to accommodate a tube, such as the tube 25, having relatively thick walls. As with the embodiment of FIGS. 1–5, in the embodiment of FIG. 6 the elements of the coupling are held together for shipping and storage by the plug 26.

Figure 7:
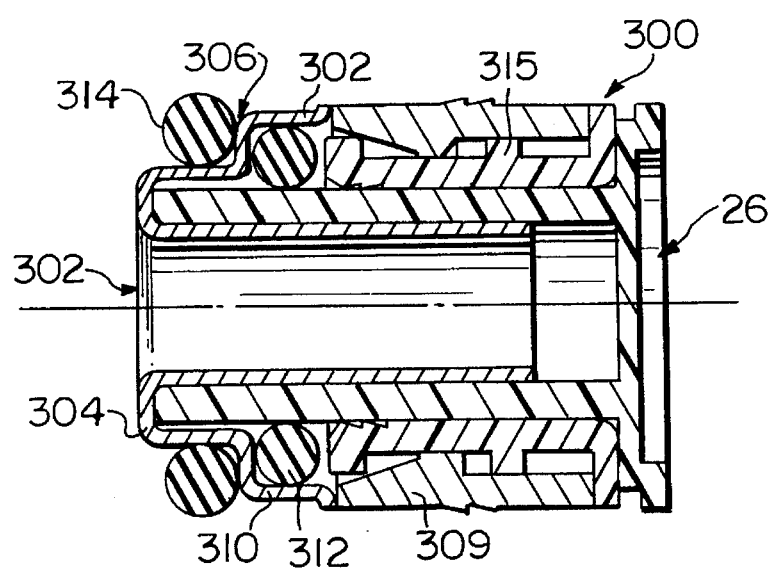
FIG. 7 is a side elevational view of a third embodiment of the present invention.

FIG. 7—The Third Embodiment

The third embodiment 300 of the coupling assembly uses a unitary brass tube support and O-ring gland 302 having a base portion 304 that provides a stepped portion 306 for engaging a brass sleeve 309 and an O-ring gland 310 for locating a primary O-ring 312 and a secondary O-ring 314. In the second embodiment of FIG. 7, the secondary O-ring 314 has a larger diameter than the primary O-ring 312. This is because the brass tube and O-ring gland support 302 has a relatively thin wall as compared to the molded plastic tube supports 20 and 202 of the embodiments of FIGS. 1–5 and FIG. 6.

Figure 5:
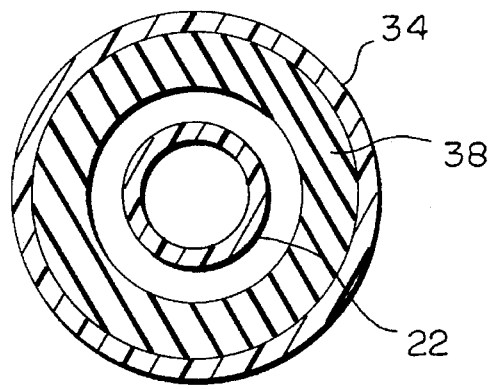
FIG. 5 is an elevational view taken along lines 5—5 of FIG. 1.

In the embodiment of FIG. 7, the brass sleeve 309 is substantially the same as the brass sleeves 50 and 209 of FIGS. 1–5 and 6 and the collet 315 is substantially the same as the collets 60 and 216 of FIGS. 5 and 6. As with the tube support 202 of FIG. 6, the tube support and O-ring gland 302 of FIG. 7 is metal with a relatively thin wall so as to accommodate tubes, such as the tubes 25 of FIGS. 1 and 2, having relatively thick walls.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a quick-connect coupling, useful to connect a tube or a plug within a bore formed in bodies in alignment with fluid passages, wherein the coupling include a tubular tube support of an outside diameter suitable for frictionally engaging the inner wall of the tube or plug; a sleeve having an inner diameter greater than the outer diameter of the tube or plug and an outer diameter engaging the diameter of the bore for frictionally retaining the sleeve in the bore; a collet having an outer diameter engaging the inner diameter of the sleeve and an inner diameter greater than the outer diameter of the tubular tube support and slightly less than the outer diameter of the tube or plug wherein the tube or plug is frictionally retained between the collet and tubular tube support, and at least one O-ring seal disposed around the coupling; the improvement comprising:

a base support extending radially from the tubular tube support, the base support having an axially extending portion with an end facing the sleeve; and an inner end face on the sleeve, the inner end face on the sleeve abutting the end face on the axially extending portion of the base support.

2. The improvement of claim 1, wherein a step is provided in the base support of the tubular tube portion adjacent the axially extending portion, the step defining an interior and an exterior space and wherein a primary O-ring seal is disposed in the interior space to seal against the tube or plug and secondary O-ring seal is disposed in the exterior space to seal with the bore.

3. The improvement of claim 2, wherein the collet has inner and outer ends with the inner end being aligned with and facing the primary O-ring seal and the outer end having a flange disposed over an outer end of the sleeve.

4. The improvement of claim 3, wherein the collet has an inner surface adjacent the inner end thereof with teeth therein for engaging the exterior surface of the tube or plug.

5. The improvement of claim 4, wherein the sleeve is made of metal and the tubular sleeve support is made of plastic.

6. The improvement of claim 5, wherein the collet is made of plastic.

7. The improvement of claim 1, wherein the sleeve is made of brass and the tubular tube support and base are made of plastic.

8. The improvement of claim 7, wherein the tubular tube support and base are unitary.

9. The improvement of claim 1, wherein the tubular tube support is metal and the base support comprises a radial flange integral with the tubular tube support and extending radially therefrom and wherein the axially extending portion is plastic and is positioned in abutment with the radial flange.

10. The improvement of claim 9, wherein a step is provided in the base support of the tubular tube portion adjacent the axially extending portion, the step defining an interior and an exterior space and wherein a primary O-ring is disposed in the interior space to seal against the tube or plug and secondary O-ring is disposed in the exterior space to seal with the bore.

11. The improvement of claim 9, wherein the sleeve is metal.

12. The improvement of claim 1, ,wherein the sleeve is metal and wherein the tubular tube support, base and the axially extending portion thereof are unitary and formed of metal.

13. The improvement of claim 12, wherein a step is provided in the base support of the tubular tube portion adjacent the axially extending portion, the step defining an interior and an exterior space and wherein a primary O-ring is disposed in the interior space to seal against the tube or plug and secondary O-ring is disposed in the exterior space to seal with the bore.

14. The improvement of claim 12, wherein the metal is brass.

* * * * *